(12) United States Patent
Crawford et al.

(10) Patent No.: US 6,985,185 B1
(45) Date of Patent: Jan. 10, 2006

(54) DYNAMIC RANGE VIDEO CAMERA, RECORDING SYSTEM, AND RECORDING METHOD

(75) Inventors: John O. Crawford, Hopkinton, MA (US); Herbert A. Thaler, Framingham, MA (US); Koichiro Hori, Framingham, MA (US)

(73) Assignee: Applied Vision Systems, Inc., Framingham, MA (US)

( * ) Notice: Subject to any disclaimer, the term of this patent is extended or adjusted under 35 U.S.C. 154(b) by 953 days.

(21) Appl. No.: 09/640,405

(22) Filed: Aug. 17, 2000

Related U.S. Application Data

(60) Provisional application No. 60/149,237, filed on Aug. 17, 1999.

(51) Int. Cl.
*H04N 5/235* (2006.01)

(52) U.S. Cl. ...................................... 348/362; 348/364

(58) Field of Classification Search ................ 348/143, 348/430.1, 362, 229.1, 459, 364
See application file for complete search history.

(56) References Cited

U.S. PATENT DOCUMENTS

| | | | |
|---|---|---|---|
| 4,851,915 A | 7/1989 | Yang et al. | |
| 4,875,100 A | 10/1989 | Yonemoto et al. | |
| 5,075,775 A | 12/1991 | Kawaoka et al. | |
| 5,101,276 A | 3/1992 | Ohta | |
| 5,157,502 A | 10/1992 | Nakajima et al. | |
| 5,283,655 A | 2/1994 | Usami | |
| 5,376,964 A | 12/1994 | Soga et al. | |
| 5,420,635 A * | 5/1995 | Konishi et al. ............. | 348/362 |
| 5,448,293 A | 9/1995 | Kogane et al. | |
| 5,488,389 A * | 1/1996 | Nakanishi et al. .......... | 345/670 |
| 5,517,242 A | 5/1996 | Yamada et al. | |
| 5,831,676 A | 11/1998 | Takahashi et al. | |
| 2002/0071044 A1 * | 6/2002 | Takahashi et al. .......... | 348/294 |

FOREIGN PATENT DOCUMENTS

JP        03179889 A  *  8/1991

\* cited by examiner

*Primary Examiner*—Wendy R. Garber
*Assistant Examiner*—Nelson D. Hernandez
(74) *Attorney, Agent, or Firm*—Pandiscio & Pandiscio

(57) ABSTRACT

The invention provides for capturing and displaying video images by (1) creating a video signal comprising a succession of video fields or frames containing optical image video data representing the captured optical image, with a plurality of first video fields or frames representing the optical image at a first exposure level and a plurality of second video fields or frames representing the optical image at a second exposure level different from the first exposure level, with the first field or frames being interspersed among said second fields or frames, and (2) utilizing that video signal to (a) generate a video display of the image represented by said first video fields or frames or the image represented by said second video fields or frames, or (b) concurrently generate a first video display of the image represented by said first video fields or frames and a second video display of the image represented by said second video fields or frames. In addition to, or instead of, using the video signal output to generate a video display in real time, the invention provides for recording the video signal output of the camera, and subsequently using the recorded video signal to generate video displays of the optical image represented by said first or second fields or frames consisting of the optical image data represented by said first or second video fields or frames.

23 Claims, 5 Drawing Sheets

DYNAMIC RANGE VIDEO CAMERA, RECORDING SYSTEM, AND RECORDING METHOD

This application claims the benefit of U.S. Provisional Patent Application No. 60/149,237, filed Aug. 17, 1999.

This invention relates to improving the dynamic range of video systems that produce and record continuous streams of video signals, notably but not exclusively video camera systems that are intended for remote viewing surveillance and inspection, and recording for security purposes.

BACKGROUND AND PRIOR ART

Use of video camera systems for unattended recording of a scene is well known. In security applications, for example, several video cameras will be connected to a recording system that periodically records a short period of video from each camera. Typically these cameras are designed to work in an auto-exposure mode, where a device called an electronic shutter varies the integration time of each video frame to match the ambient lighting conditions. Typically, these cameras produce a continuous stream of standard video signals that contain two fields of video that are interlaced to create one frame of video. For example, the standard U.S. system, NTSC or RS-170 video, has 262.5 lines of video in one field interlaced with 262.5 lines in a second field, with the second set starting $\frac{1}{60}$ sec. later than the first set. The video monitor or recorder used with these signals combines these fields alternately to produce a full frame of video for viewing. In addition, other video systems exist that are called progressive scan systems. In these latter systems, a full frame of video is created without interlace, typically every $\frac{1}{60}$ sec.

In these systems, the video signals are represented by a voltage. In each field or frame, there will be a maximum voltage, representing the maximum amount of light the video system can convert into a signal, and a minimum voltage representing the minimum amount of light the system can reliably represent. In a particular scene viewed by the camera, the image of the scene is converted to a video signal voltage representative of the scene with a range of voltages in between the maximum and minimum values. For a typical scene, and a particular value of auto-exposure, there may be portions of the scene that are too dark to contain any usable information, and other portions that are too light to be of use. In a surveillance application, for example, this can result in a situation where an essential part of the image is too light, or too dark, to be visible.

Heretofore one approach to overcoming the foregoing problem involves use of a combination dual exposure video camera. Combination dual exposure video cameras are commercially available, but are not as common as standard single exposure video cameras. Combination dual exposure camera systems comprise a camera that creates two different exposures of the same optical image via an electronic shutter within the time frame of each field or frame, and means for combining both exposures into a single output field or frame. This results in a single image manufactured from the two different exposure parent images which spans a wider range of scene illumination values, but which is compressed within the voltage limits of a single video frame.

This prior art approach is illustrated schematically in FIG. 1 where a dual exposure camera P1 is viewing a vase on a windowsill while a bird flies by outside. The camera P1 takes two exposures, a long period exposure represented at P4$a$, and a short period exposure represented at P4$b$, each within the time frame of a single video field (interlaced scan) or frame (progressive scan), and combines the video signals representing those two different exposures in a processor P3 according to a pre-programmed algorithm. The resulting image is represented at P4$c$. Both the bird and vase are visible in the combined image P4$c$. However, while this image combining process converts a wider range of scene illumination values, it does so at the cost of reducing contrast from the resultant image by omitting various information contained in one or the other of the parent images. This omitted information is viewed in good faith as unimportant to the final image. However, such a judgment is not always proper or acceptable, particularly in video surveillance installations. Further, when such manufactured image fields are recorded, most of this dynamic range improvement is limited in post processing. This is because the information available in the manufactured image fields formed by combining signals no longer contains the full information present in the original pictures.

OBJECTS AND SUMMARY OF INVENTION

A primary object of this invention is to provide a method and apparatus for improving the dynamic range of a video system for viewing an object or scene and generating a continuous stream of video signals that define video fields or frames representing the viewed scene or object.

Another object of the invention is to provide a video system for viewing and recording a scene or object with as video camera whereby a stream of video signals is produced that defines a sequence of video fields or frames with video data representing at least two different exposure levels, and processing that stream of video signals to generate a flicker-free display of recorded images.

A further object of this invention is to provide a method and apparatus for producing a series of video signals representing a sequence of video fields or frames of a selected optical image, with at least certain of the video fields or frames comprising data representing a first exposure level and others of said fields or frames comprising data representing a second greater or lesser exposure level, and utilizing the series of video signals to generate a flicker free video display of the selected optical image.

The foregoing objects, and other objects that are rendered obvious from the following description, are achieved by creating successive video fields or frames with different exposures, merging them into one continuous video signal, and recording each successive field or frame independently. More specifically, this is achieved by providing a video camera with an electronic shutter for capturing an optical image, and controlling operation of the shutter whereby the camera will produce a video signal output comprising a succession of video fields or frames representing the optical image, with a plurality of first video fields or frames representing the optical image at a first exposure level and a plurality of second video fields or frames representing a second exposure level different from the first exposure level, with the first field or frames being interspersed among said second fields or frames. Such video signal output is utilized to generate a video display of the video data matching a particular set, or combination, of exposures. In addition to, or instead of, using the video signal output to provide an individual video display, consisting of the optical images represented by said first or second video fields or frames, concurrently with capturing further optical images, the invention provides for recording the video signal output of the camera for subsequent use in generating a video display consisting of the optical image data represented by said first or second video fields or frames. In other words, the display may be generated during or after recording. In comparison to the video signal output of the dual exposure camera illustrated in FIG. 1, the recorded video signal of this invention, comprising first and second pluralities of video fields or frames of different exposure levels, possesses a wider effective range of signal values due to the range of exposures recorded, covers a wider gamut of scene illumination, and has a higher dynamic range. By tailoring the number of different exposures to the camera and the video recorder, the full available dynamic range of the camera's video sensor may be preserved. Additionally, the invention optionally includes post-processing of selected exposures to combine fields or frames, or portions of fields or frames, with fields or frames of other exposures, so as to achieve the substantially the same result as is possible with prior art combination dual exposure cameras like that illustrated in FIG. 1, but achieving its purpose using standard, commonly available, video cameras in place of combination dual exposure cameras.

THE DRAWINGS

FIG. 1 schematically illustrates a prior art combination dual exposure camera;

FIG. 2 schematically illustrates a preferred embodiment of the invention;

In the several figures, like numbers are used to designate like components and like schematic representations.

DETAILED DESCRIPTION OF THE INVENTION

Figure 1:
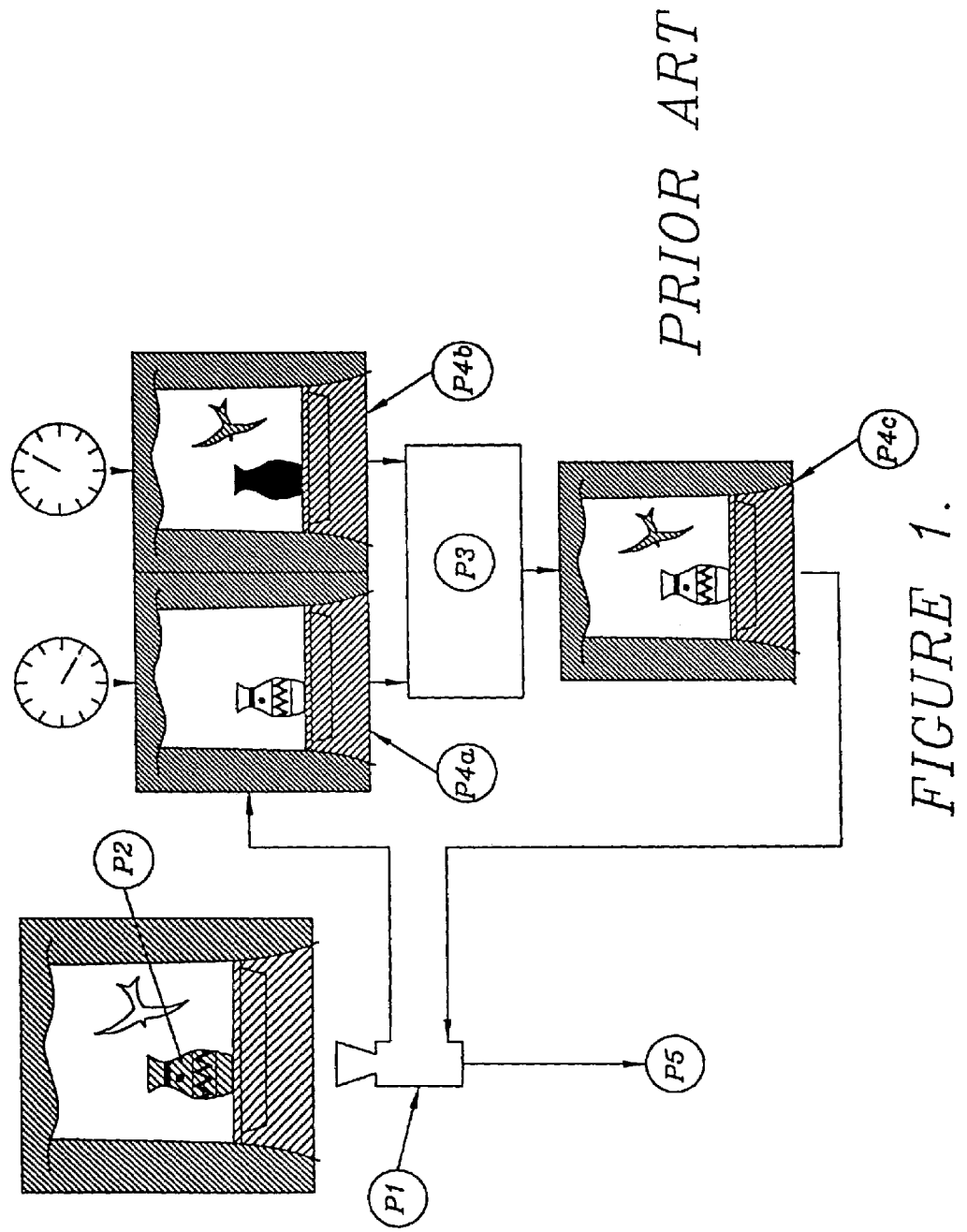
Figure 2:
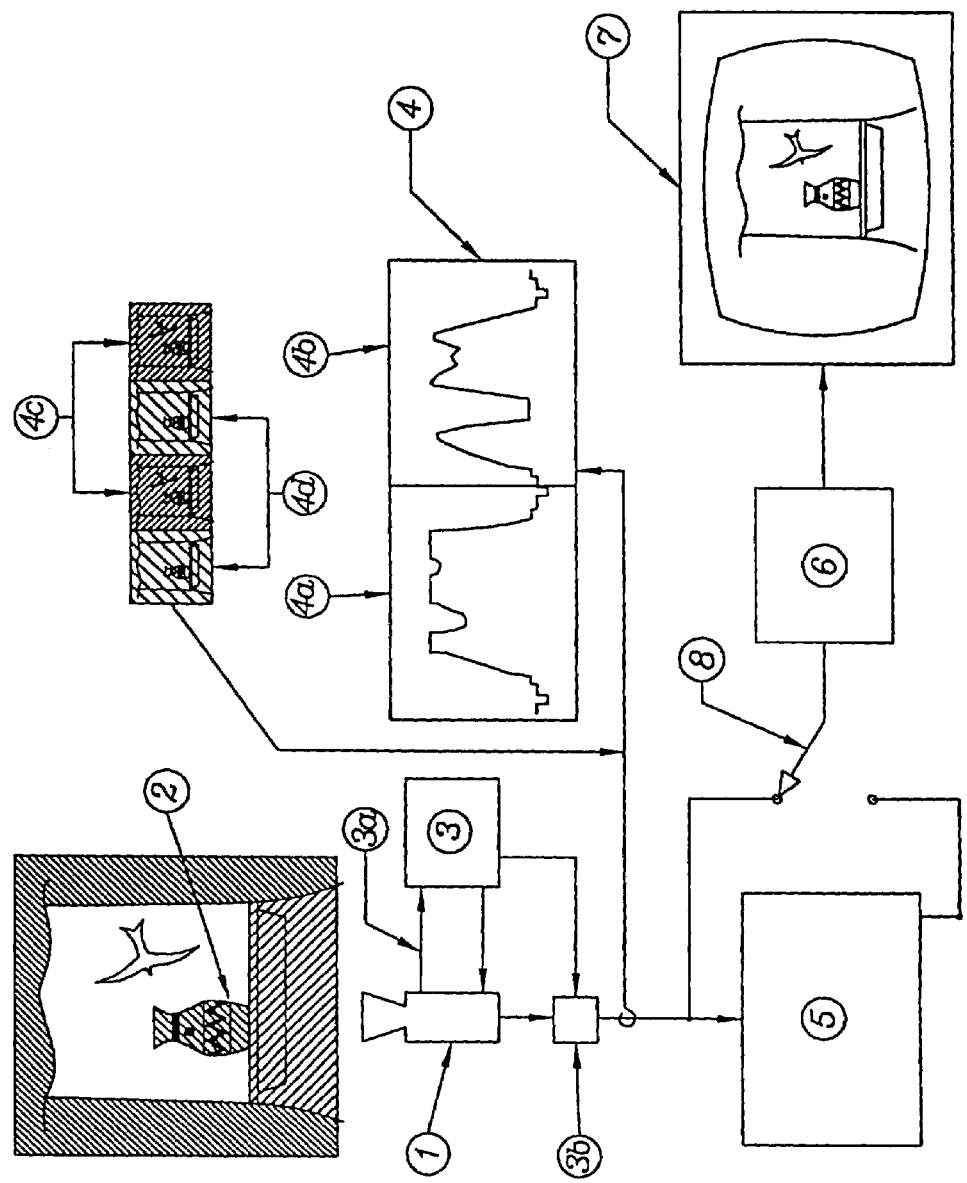

FIG. 2. illustrates a preferred embodiment of this invention. A video camera 1 is aimed at a vase 2 on a window ledge as a bird flies by outside. The camera has a video detector (not shown) in the form of a photoresponsive CCD or MOS video sensor, and a lens that images the scene on the video detector. In this embodiment, the camera is designed to produce two interlaced fields, field 1 and field 2, per frame, e.g., according to the standard U.S. video system, NTSC or RS-170 video. Camera 1 also contains an electronic shutter (not shown). CCD and MOS video detectors having electronic shutters are well known, as demonstrated by the following U.S. patents: U.S. Pat. No. 5,793,422, issued 11 Aug. 1998 to T. Mochizuki et al.; U.S. Pat. No. 5,448,293, issued 5 Sep. 1995 to H. Kogane et al.; U.S. Pat. No. 5,410,349, issued 25 Apr. 1995 to H. Tanigawa et al.; U.S. Pat. No. 5,283,655, issued 1 Feb. 1994 to M. Usami; U.S. Pat. No. 5,247,367, issued 21 Sep. 1993 to J. Lee; U.S. Pat. No. 5,157,502, issued 20 Oct. 1992 to T. Nakajima et al.; U.S. Pat. No. 5,075,775, issued 24 Dec. 1991 to Y. Kawaoka et al.: U.S. Pat. No. 4,875,100, issued 17 Oct. 1989 to K. Yonemoto et al; and U.S. Pat. No. 4,743,778, issued 10 May 1988 to N. Takatsu et al. To the extent that they are relevant, the teachings of those patents are incorporated herein by reference. The electronic shutter of camera 1 is connected to an external controller 3. The electronic shutter allows controller 3 to regulate the integration time of the camera's video detector during each field interval. The camera provides a synchronizing signal to the controller 3, as shown at 3a, so that the latter will cause the camera's electronic shutter to vary the exposure time for each field, i.e., regulate the integrating time of the camera's video detector in synchronism with each video field. During field 1 the controller sets the integration time to a predetermined slow speed, for example, $\frac{1}{60}$ second. During field 2 the controller sets the integration time to a predetermined fast speed, for example, $\frac{1}{6000}$ second. The resulting video signal values for a single row of video data is represented at 4. At 4a, the result of the slow ($\frac{1}{60}$ second) exposure is shown. In this case; the portions of the image representing sky is at the maximum signal level, the vase appears as a slight reduction in signal level, and the bird gives substantially no change in signal since it is so close to the brightness of the sky that it is indistinguishable from the background sky. At 4b, the result of the short ($\frac{1}{6000}$ second) exposure is shown. In this case, the portions of the image representing sky are below the maximum signal level, the vase appears as a drastic reduction in signal level, and the bird gives a significant change in signal since it is sufficiently different from the brightness of the sky to be distinguishable. Essentially the system shown in FIG. 2 uses a single video camera under the control of a pre-programmed exposure controller to provide an output video signal representing a continuous sequence of video fields consisting of fields of one exposure time (e.g., $\frac{1}{60}$ second) alternating with fields of a second exposure time (e.g., $\frac{1}{6000}$ second), as represented at 4d (slow, relatively long time exposure) and 4c (fast, relatively short time exposure).

The camera is connected so as to feed its output video signal, comprising a continuous sequence of video fields alternating in exposure value as represented at 4a and 4b, to a video recorder 5 where the combined alternating long and short exposure video fields are recorded. The camera also is connected so that the same continuous sequence of video fields alternating in exposure levels is delivered to a buffered signal multiplexer 6 which allows a user to select either slow or fast exposure signals for display on a monitor 7, and a selector switch 8 allows a user to display active, i.e., "live", video, or to play back prerecorded video sequences, and select slow or fast exposures for viewing. This selection of fields for display is commanded via additional exposure selection means forming part of the multiplexer shown in FIG. 3. As an optional modification described in greater detail hereinafter, a field code unit 3b is interposed between the camera and recorder 5 and multiplexer 6, with the field code unit being adapted to add a field code (and other data codes as desired by the user) to the camera's output video signal.

Figure 3:
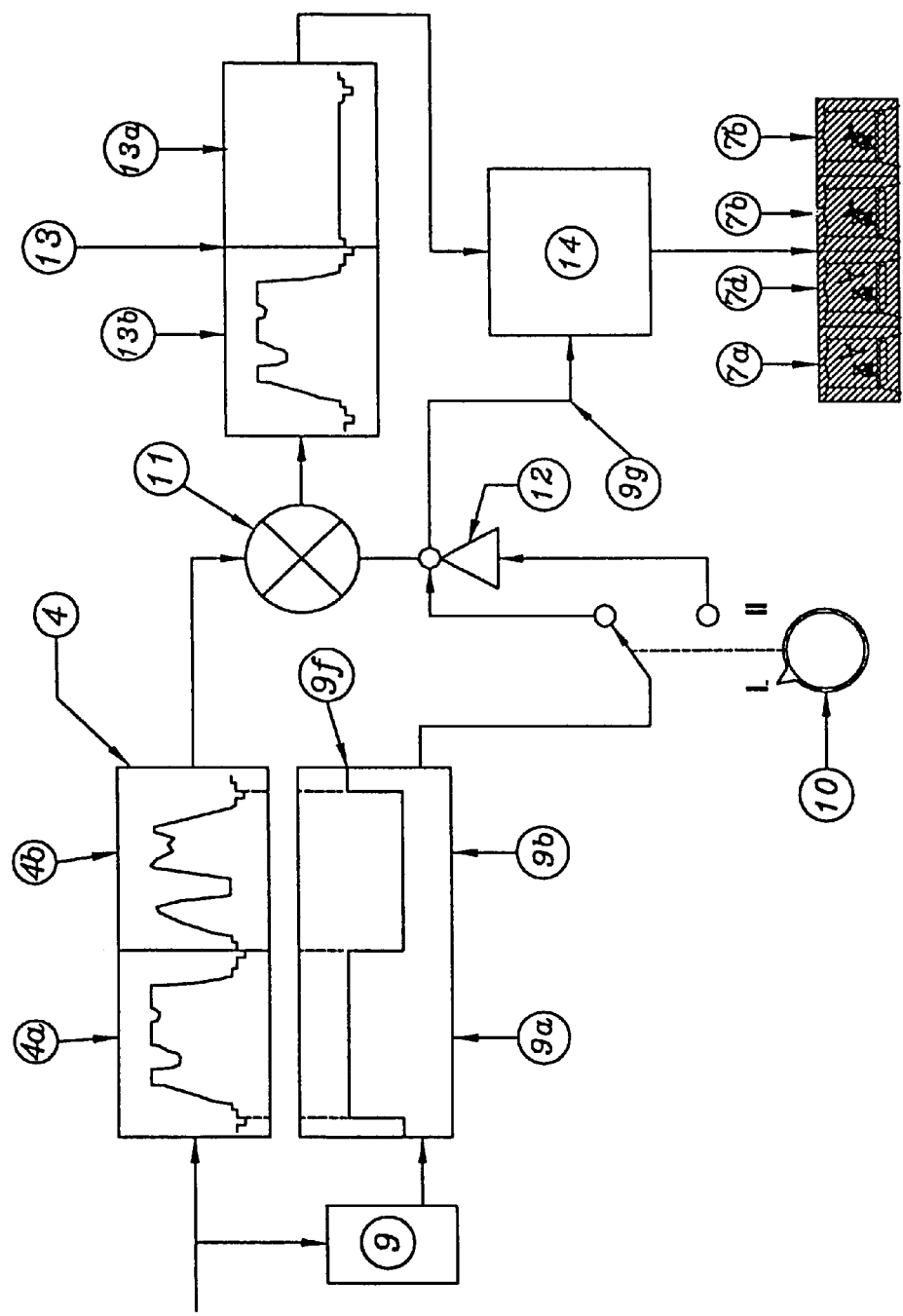
FIG. 3 illustrates details of the buffered signal multiplexer 6 shown in FIG. 2.

FIG. 3 illustrates details and operation of the buffered signal multiplexer 6 shown of FIG. 2. In the following description of FIG. 3, it is to be understood that the video system does not include field code unit 3b. The multiplexer includes a field detector 9, a blanking circuit 11, an inverter 12 and a selectively loaded repeating first in/first out memory or buffer 14, referred to hereinafter as FIFO 14, which has its video data input side coupled to blanking circuit 11. The camera's output video signal, comprising alternately occurring different exposure value video fields as represented at 4a and 4b, is presented to the detector 9 and also via blanking circuit 11 to FIFO 14. The detector generates a field signal pulse 9f from the camera's output video signal for use in controlling operation of FIFO 14. By way of example but not limitation, field detector 9 may be a conventional video sync. separator circuit. The field signal pulse 9f is high, as shown at 9a, during fields of one exposure and low, as shown at 9b, during the fields of the other exposure. The field signal pulse 9f is applied to that blanking circuit via an exposure selection switch 10. Depending on the position of exposure selection switch 10, the field signal pulse 9f is routed to blanking circuit 11 either directly or via an inverter 12. The field signal pulse 9f serves to gate the blanking circuit so as to blank the signals representing video fields 4a or 4b according to whether the corresponding field pulse signal 9f is or is not inverted. The output of the blanking circuit is represented at 13. If the field signal pulse applied to it is low, the blanking circuit 11 is rendered inactive and the signal representing the corresponding video field will pass through the blanking circuit without any substantial change, as represented by video signal 13b. However, if the field signal pulse 9f applied to the blanking circuit is high, the signal for the corresponding video field is blanked and the signal output from the blanking circuit will be a fixed voltage level, as represented at 13a. As shown in FIG. 3, switch 10 is set to bypass inverter 12, so that the field pulses 9f are applied without inversion directly to blanking circuit 11. As a result, the short (fast) exposure video field signals 4b are blanked out and long (slow) exposure video field signals 4a pass through the blanking circuit unchanged, as represented at 13b.

Still referring to FIG. 3, the sequence of video field signals 13a, 13b are routed to FIFO 14. Fields of video data are selectively written into FIFO 14 under the control of the field pulse 9f applied via control line 9g. Essentially the field pulse 9f functions as a field selection control signal for FIFO 14. Readout of the FIFO contents is continuous so as to create a continuous output video data stream. If new video data representing long (slow) exposure video fields, as represented at 4a, is entered into the FIFO, then new data is read out of the FIFO. If, on the other hand, no new data is entered into the FIFO for one or more field times, i.e. if the signals for video fields 4b have been blanked by blanking circuit 11, then the existing data representing video fields 4a coming out of the FIFO will be recirculated in the FIFO and continuously read out in place of the data for the blanked out video fields 4b. Stated another way, if the multiplexer is set to so that blanking circuit 11 will pass only video field signals 4a, the data contained in the video signals 13b that are read into FIFO 14 will be read out in synchronism with their input into FIFO 14, and will also be stored in FIFO 14. When a video signal 13a representing a blanked video field is passed from blanking circuit 11 to FIFO 14, existing data in FIFO 14 representing a previously recorded video signal 13b will be recirculated and read out in place of that blanked out video signal. This operation results in a continuous sequence of video fields as shown at 7a to 7b', where fields 7a' and 7b' are duplicates of previously occurring fields 7a and 7b, and are inserted in place of blanked fields. Since these video fields all represent essentially the same exposures levels, they can be displayed in sequence flicker-free on a conventional video monitor. The absence of flicker renders the display comfortable to the user's eyes, facilitating assessment of the displayed images.

Still referring to FIGS. 2 and 3, the illustrated system may be modified by including the field code unit 3b which inserts a frame code to each video field. The frame code essentially comprises a field code, and preferably the field code unit also is adapted to add to each field such data as a date code, time code, frame serial number code, camera code (preferred, for example, where several cameras are used for surveilling a particular site), other exposure information and/or other information supplied by the user. The frame code is inserted by field code unit 3b under control of the external controller 3. Field code unit 3b is adapted to add a first field code to the signal for video fields or frames of one exposure, e.g., exposure fields 4a, and a second different field code to the signal for video fields or frames of a different exposure, e.g., exposure fields 4b. With this modification, the field detector 9 is adapted to detect the field codes inserted by field code unit 3b and to generate field signal pulses similar to pulses 9a and 9b corresponding to and identifying the two different codes. These field signal pulses, which serve as field selection control signals, are applied to blanking circuit 11 and FIFO 14, whereby the FIFO can respond to read out a continuous sequence of like video fields as represented at 7a–7b' in the manner previously described. Depending on the setting of switch 10, the output of FIFO 14 applied to monitor 7 will generate a display of the images represented by fields 4a or fields 4b. This modification is advantageous in that the presence of the field codes added by field code unit 3b makes it possible to identify and read out fields 4a or 4b regardless of where they occur in the sequence of video fields represented by the camera's video signal output, and to generate the appropriate field signal pulse for each field. In this connection, it is to be understood that the system of FIGS. 2 and 3 also may be used where the video camera is designed for a progressive scan system, i.e., where each frame consists of a single field (e.g., a field consisting of 525 lines) instead of two interlaced video fields (e.g. each field consisting of 262.5 lines). In the case of a progressive scan system, the controller 3 controls the electronic shutter whereby the output signal of the camera represents frames of one exposure value alternating with frames of a second exposure value, the field code unit 3b applies a field code to each frame that identifies each frame according to whether it is has the first or second exposure value, and the multiplexer operates under control of the pulse signal 9f to transmit a video output to the monitor 7 that consists of video frames of like exposure value.

Figure 4:
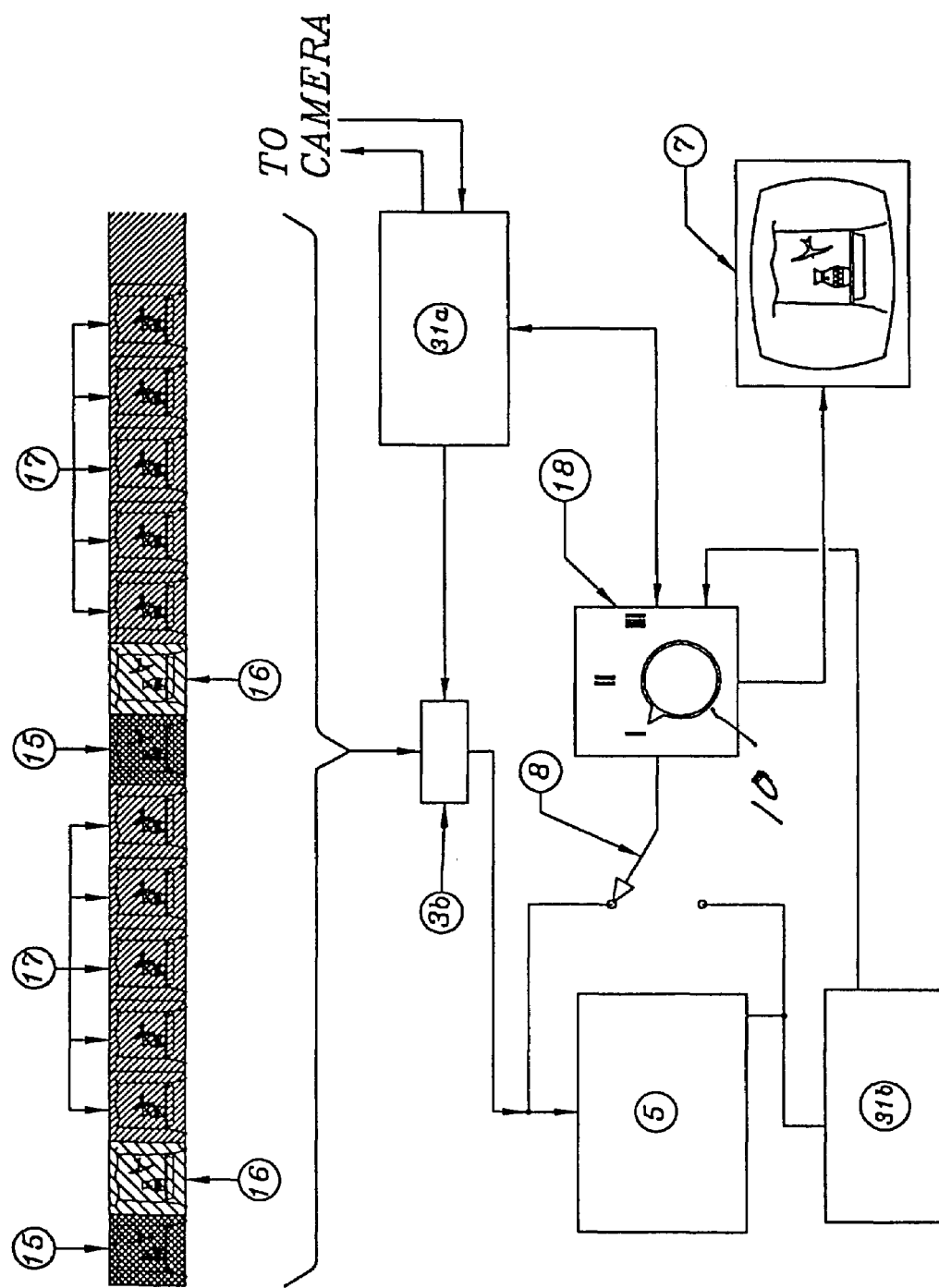
FIG. 4 illustrates a second embodiment of the invention.

FIG. 4. illustrates an alternative embodiment of this invention. In this embodiment, the external controller 31a is essentially the same as controller 3 of FIG. 2, but is programmed or adapted to command the camera to produce slow and fast exposure fields as represented at 16 and 15 interspersed among fields of nominal autoexposure value as represented at 17. The system of FIG. 4 also includes a field code unit 3b, a recorder 5, a monitor 7, a multi-channel buffered multiplexer 18 which includes a blanking circuit (not shown) and FIFO memory (not shown) similar to those shown at 11 and 14 in FIG. 3, a playback decoder 31b, and a switch 8 for selectively coupling to the multiplexer as input data the video signal output from the camera or prerecorded video signals played back from recorder 5. As described in greater detail hereinafter, the field code unit 3b, under control of controller 31a, adds field-identifying field codes to the video fields defined by the video signal output of camera 1. Additionally the controller 31a also generates field selection control signals and the controller and multiplexer 18 are linked as shown to permit those field selection control signals to be passed from controller 31a to the blanking circuit (not shown) of multiplexer 18. In this embodiment, selector switch 8 affords the user the option of sending to buffered multiplexer 18 either active ("live") video, or pre-recorded video sequences. Multiplexer 18 also provides the option, represented herein by a switch 10, of selecting fast video fields 15, slow video fields 16 or nominal exposure video fields 17 for viewing on monitor 7. Essentially as represented by switch 10, the multiplexer has means for selecting which two of the three different exposure video fields are to be blanked out so as to permit the FIFO to read out a continuous sequence of the third exposure video fields. It also is preferred that the multiplexer be adapted to generate exposure-modifying signals and that it be linked to controller 31a as shown so that those exposure-modifying signals can be applied to controller 31a to cause the latter to effect a change in the exposure levels selected for any of fields 15, 16 and 17.

Just as described for the preferred embodiment of FIG. 2, the video fields of different exposures represented at 15, 16 and 17 are recorded in recorder 5 in the sequence in which they are produced. In this case, the field code unit 3b, which is essentially the same as field code unit 3a, operates under control of controller 31a to insert into the signal for each video field (or each frame in the case of a progressive scan video system) a frame code that necessarily includes a field code which specifically identifies the particular field according whether it is a slow, fast or nominal exposure field. As with the system of FIGS. 2 and 3, the frame code inserted by field code unit 3b may also include other data as, for example, date and time codes, frame serial number code, and camera number code. More specifically, the field code unit adds a first field-identifying field code to the video signal for video fields 15, a second field-identifying field code to the video signal for video fields 16, and a third field-identifying field code to the video signal for video fields 17. Further with respect to the field selection control signals produced by controller 31a, a different field selection control signal is generated for each field code and those field selection control signals are applied to the blanking circuit of multiplexer 18. Depending upon the particular exposure video field selected by operation of switch means 10 for viewing on monitor 7, the multiplexer selects certain of the field selection control signals from controller 31a to apply to its blanking circuit to blank out unwanted video fields, whereby to achieve the result of its FIFO reading out a video signal output, for application to monitor 7, which comprises only those video fields having the selected exposure value.

By way of example, multiplexer 18 may be set to select only video fields 15 for display, in which case each time the camera's output signal includes a video field 16 or 17, the multiplexer will substitute in the signal output read from its FIFO video signal data representing a video field 15 for each video field 16 and also for each video field 17. This result is achieved by using the field selection control signals received from controller 31a to cause the blanking circuit to blank out successive video fields 16 and 17, so that only video fields 15 pass substantially unchanged to the FIFO portion of the multiplexer.

The embodiment of FIG. 4 also includes a playback decoder 31b which is coupled to recorder 5 and also to switch 8. Decoder 31b is adapted to decode the field code inserted by field code unit 3b and generate field selection control signals, corresponding to those generated by controller 31a, and to apply those signals to multiplexer 18 for the purpose of blanking out fields of undesired exposure value and causing the FIFO to read out a continuous sequence of video fields of like exposure values, e.g., fields 15, in the manner described in connection with the embodiment of FIGS. 2 and 3.

An obvious advantage of the embodiment of FIG. 4 is that it permits viewing of nominal exposure fields 17 in real time, while simultaneously recording all of the dynamic range fields 15, 16, and 17. The buffer memory of multiplexer 18 is programmed so that it can repeat either long, short, or nominal exposure fields for viewing, while the viewed fields and also the other fields are recorded in a time lapse manner, based on the field codes inserted by the field code unit 3b under control of the external controller 31a.

Figure 5:
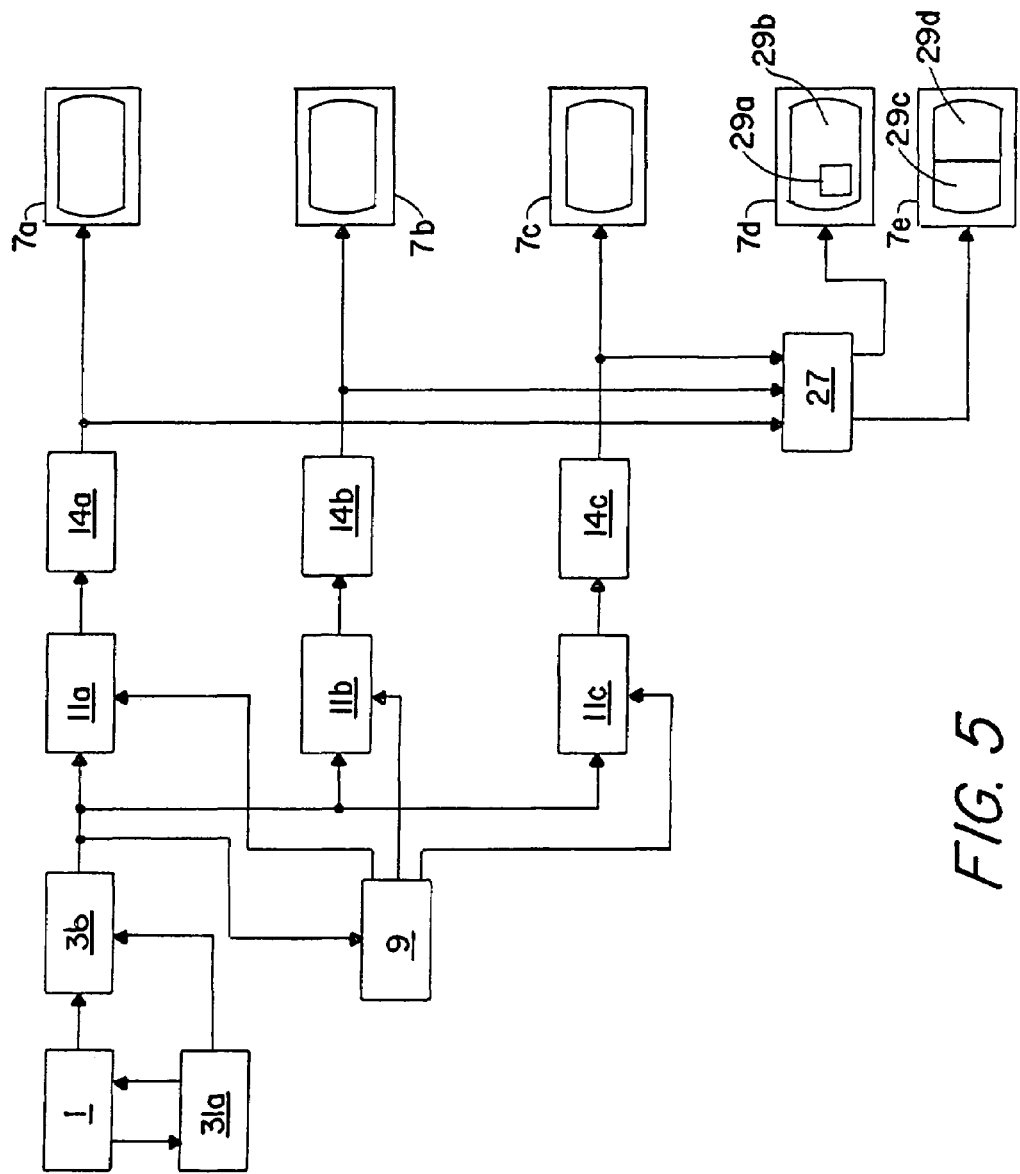
FIG. 5 illustrates a further modification of the invention.

FIG. 5 illustrates a further advantage of the invention. In this case the system comprises video camera 1, field code unit 3b, controller 31a, and a multiplexer 18a which comprises a field code detector 9, three blanking circuits 11a, 11b and 11c, and three FIFO units 14a, 14b and 14c. The controller is programmed to cause the electronic shutter to change exposures for successive video fields or frames according to a predetermined pattern, e.g., to produce a sequence of video fields as represented at 15, 16 and 17 in FIG. 4. The field code unit 3b, operating under control of controller 31a, inserts field-identifying field codes (either alone or as part of frame codes that also include other information such as date, time, frame number, camera number, etc.) into the video signal output of camera 1 as in the embodiment of FIG. 4. More specifically, the field code unit adds a first field-identifying field code to the video signal for video fields 15, a second field-identifying field code to the video signal for video fields 16, and a third field-identifying field code to the video signal for video fields 17. Also field code detector 9 generates different field selection control signals in response to its detection of different field codes. Those field selection control codes are applied to blanking circuits 11a, 11b and 11c. The video signal output of camera 1, after the addition of field codes by field code unit 3b, is applied to FIFO 14a, 14b and 14c via blanking circuits 11a, 11b and 11c respectively. The video signal outputs of FIFO 14a, 14b and 14c may be applied to separate monitors 7a, 7b and 7c respectively. Still referring to FIG. 5, as an alternative or additional measure, the outputs of FIFO 14a, 14b and 14c are applied to a conventional video effect generator 27 which is adapted to provide signals for controlling a monitor so that it will display multiple images, e.g. in a picture in a picture (PIP) format as represented schematically by the areas 29a and 29b of a monitor 7c or in a side-by-side format as represented by the areas 29c and 29d of a monitor 7e. It also is contemplated that the video effect generator 27 may be designed so as to cause monitor 7e to produce three simultaneous displays corresponding to the different exposure values of the video fields 15, 16 and 17 read out of FIFO 14a, 14b and 14c respectively.

As with the embodiment of FIG. 4, the system of FIG. 5 operates to blank out undesired video fields for the purpose of providing a display generated by a continuous sequence of video fields of like exposure values. In the system represented in FIG. 5, the field selection control signals received from field code detector 9 cause blanking circuit 11a to blank out video fields 16 and 17, whereby only the data representing video fields 15 is read into FIFO 14a, and FIFO 14a recirculates that data and substitutes that data for the blanked out data of video fields 16 and 17. Similarly the field selection control signals from detector 9 cause blanking circuit 11b to blank out fields 15 and 17, whereby only the data representing video fields 16 is read into FIFO 14b, and FIFO 14b recirculates that data and substitutes that data for the blanked out data of video fields 15 and 17. Of course, the multiplexer of FIG. 5 may be adapted to generate exposure-modifying signals which are applied to controller 31a for the purpose of modifying the exposure levels for any of the fields 15, 16 or 17.

Although conventional video cameras are designed to produce video signals representing two fields of video that are interlaced to create one frame of video, it is recognized that progressive scan systems are expected to become more prominent with the increased adoption of high definition digital TV. Accordingly, the invention offers the advantage of being applicable to progressive scan video systems. In this connection, it is to be understood that as used herein the term "frame" is to be construed as comprising two interlaced fields as in conventional TV systems, or a single field as is the case in progressive scan systems. Accordingly in the case of single field video frames, the field identification code mentioned above actually identifies a full frame.

The invention is susceptible of various modifications. Thus, for example, the continuous stream of video signals of like exposure level that is read out of multiplexer 6 or 18, either as live video or as playback from recorder 5, may be fed to a recorder, e.g., to recorder 5, for archival and subsequent display purposes. Further, in the case of direct feeding of the camera's output signal to recorder 5, it is contemplated that when that recorded signal is played back and processed by the multiplexer so as to provide a video signal feed to the monitor comprising a continuous sequence of video signals of like exposure level, that same signal feed will be recorded in recorder 5 or another recorder for subsequent use and analysis.

Another modification involves programming the buffered multiplexer 6 or 18 so that it is will produce concurrently a first stream of video signals representing a first exposure level and second stream of video signals representing a second different exposure level, and feeding both streams of video signals to a monitor for display simultaneously. In such case, the monitor may be operated so that the two signal streams provide images that appear as a picture in a picture display or in a split screen display. The appearance of two images on the screen simultaneously, one representing a relatively long exposure and the other representing a relatively short exposure level, offers the advantage of maintaining the full dynamic range that is available using different exposures. It is contemplated also that the embodiment of FIG. 4 may be modified to permit display of three separate images simultaneously, one consisting of relatively long exposure images, a second consisting of relatively short exposure images, and a third consisting of nominal exposure images. Of course, the system also permits the exposure levels to be varied within the dynamic range of the video detector. Further, the number of different exposure levels determined by controller 31a is variable, e.g. five different exposure levels may be selected. As for the camera's controller, it may be programmed so as to generate video fields with different exposures produced in either a consistent or non-consistent repetitive sequence. For example, with a system such as that shown in FIG. 4 or 5 where video fields or frames representing three different exposure levels are produced, the controller may be programmed to fix, or vary at a fixed or random rate or according to a predetermined pattern, the frequency of repetition of the string of consecutive video fields 17 in the continuous sequence of fields or frames represented in the camera's video output. The same is true of the case where the camera's video signal output is characterized by only first and second video fields or frames representing first and second exposure levels as represented at 4a and 4b. However, in the latter case, it is essential that the system include field code unit 3b and that the latter introduce into the video signal output of the camera field codes that identify and distinguish between the first and second exposure video fields, whereby the multiplexer may be able to select to display images represented by only the first or second video fields or frames.

It also is contemplated that the invention may be modified by using a video camera that lacks an electronic shutter. Thus it is contemplated that the detector may be a photoelectric detector wherein photons are amplified or cascaded to produce an intensified image under low light conditions, e.g., an image intensifier tube. A vidicon is another example. Where the detector lacks an electronic shutter of the type employed in a video camera using a CCD or MOS photodetector, it is contemplated use an LCD light filter whose light transmissibility varies in accordance with a control signal. By positioning this filter between the photodetector and the object or scene being captured, and by varying the filter's control signal, it is possible to vary the mount of light impinging on the photodetector during the time frame of each video field or frame, thereby making it possible to provide different exposure levels similar to what is achieved with the embodiments of FIGS. 2 and 4. It also is appreciated that variable irises or other forms of shutters may be used in the invention in place of electronic shutters, but they suffer from limitations not common to electronic shutters, notably inferior response speed, high cost and excess size.

It also is contemplated that the multiplexer 6 or 18 may be programmed or otherwise adapted to process the signal output of the video camera so as to combine the long and short exposure video fields or frames into a single video field or frame, just as is common with dual exposure cameras. However, in order to ensure that alternate light and dark fields represent contemporaneous events, it is necessary that one field or frame be delayed by one field (or frame) time frame (depending on whether interlaced field video or progressive scan video) by means of a delay buffer before being combined with another field (or frame) to produce a continuous video sequence. The multiplexer may be programmed to combine fields or frames of different exposures for display based on a predetermined processing algorithm. However, as with conventional combination dual exposure video cameras, the combined images may be blurred when they are displayed due to the time difference between the fields or frames that have been combined, and also the combined image has a reduced contrast.

The video display may take various forms. In the embodiment of FIGS. 2–4, it is preferred that the monitor 7 be a conventional video monitor operating in an analog mode. However, other video display means may be employed, e.g., a cathode ray tube type monitor operating in a digital mode, or an LCD display device. It also is contemplated that a head-mounted or heads-up display may be used.

It is to be understood that the video camera may be a conventional analog mode camera, in which case its output signal is required to be fed to an A/D converter for conversion to a digital signal before it is processed by the buffered multiplexer as described above, and the output signal from the buffered multiplexer is required to be fed to a D/A converter to produce a signal suitable for operating a conventional analog mode video monitor. Alternatively, the video camera may be a digital camera, thereby eliminating the need to include an A/D converter to permit the video signal to be processed by multiplexer 6 or 18. Similarly, the display device may be of the digital type, thereby eliminating the need to include a D/A device in the system to convert the output video signal from the multiplexer so that it can drive an analog mode video monitor. For sake of simplicity, the A/D and D/A converters are omitted from the drawings, since their need or use is obvious to persons skilled in the art. A further obvious modification is to incorporate the controller 3 or 31a into the camera.

The reader will appreciate that still other embodiments are possible without departing from the scope of the invention.

The invention herein described and illustrated provides a number of advantages. For one thing, it provides a video camera and recording and processing system with improved dynamic range. When compared to a single exposure video sequence as is produced by a conventional single exposure camera or a combined exposure video sequence as is provided by a dual exposure camera, the invention offers the advantage of preserving video information in the light portion of the image that would be lost in sensor saturation and information in the dark portion that would be lost to minimum sensitivity. In this connection it is to be appreciated that the system provides a signal containing full dynamic range information which may be recorded or utilized without combination of fields or frames and a corresponding reduction in contrast. In many applications the reduction in temporal resolution at a fixed exposure is more than compensated by the increase in dynamic range. Another advantage is that the system and method are capable of producing a continuous sequence of video signals comprising video fields or frames representing different, e.g., relatively short and relatively, long exposures, and using that sequence of video signals to generate a flicker-free video display. Also, the buffered multiplexer makes it possible to generate two or more separate sequences of video fields with each representing different exposure times, and to use those two or more sequences to simultaneously generate two or more separate displays each characterized by a different exposure value. A further advantage is that the invention may be implemented using a conventional video camera of the kind having an electronic shutter, thereby taking advantage of the relatively low cost of commercially available cameras. A further advantage is that the invention may use black and white video cameras or color video cameras.

What is claimed is:

1. A method of producing a video recording with improved dynamic range comprising:
    providing a video camera comprising a video detector capable of converting an optical image into a sequence of video fields or frames, and an electronic shutter for adjusting the amount of light received by said detector from an optical image viewed by said camera;
    operating said camera to capture an optical image;
    commanding said electronic shutter to vary the amount of light received by said video detector from said captured optical image whereby to produce from said detector an output video signal constituting a sequence of video fields or frames representing the captured optical image, with said sequence comprising at least first and second fields or frames representing different exposure values of the captured image occurring repetitively in said sequence according to a predetermined repetition frequency;
    processing said output video signal so as to produce a modified video signal consisting of a continuous sequence of said first fields or frames or a continuous sequence of said second fields or frames; and
    selectively applying said modified video signal as an input signal to a video display apparatus whereby to cause said apparatus to display said captured optical image according to the first or second fields or frames contained in said modified video signal.

2. A method according to claim 1 further including the step of recording said output video signal for use subsequently to drive a display means so that said captured optical image may be displayed according to the information contained in said first or second fields or frames.

3. A method of producing a video recording with improved dynamic range comprising:
    providing a video camera comprising a video detector capable of converting an optical image into a sequence of video fields or frames, and an electronic shutter for adjusting the amount of light received by said detector from an optical image viewed by said camera;
    operating said camera to capture an optical image;
    commanding said electronic shutter to vary the amount of light received by said video detector from said captured optical image whereby to produce from said detector an output video signal constituting a sequence of video fields or frames representing the captured optical image, with said sequence comprising at least first and second fields or frames representing different exposure values of the captured image occurring repetitively in said sequence according to a predetermined repetition frequency;
    recording said output video signal in a recording medium;
    subsequently playing said output video signal out of said recording medium;
    processing said output video signal played out of said recording medium so as to produce a modified video signal consisting of a continuous sequence of said first fields or frames or a continuous sequence of said second fields or frames; and
    selectively applying said modified video signal as an input signal to a video display apparatus whereby to cause said apparatus to display said captured optical image according to the first or second fields or frames contained in said modified video signal.

4. A method of producing a video recording with improved dynamic range comprising:
    providing a video sensor capable of converting an optical image into a video signal comprising a sequence of video fields or frames representing the optical image;
    operating said video sensor to capture an optical image and simultaneously varying the amount of light received by said video sensor during the time frame of each video field or frame so that the resulting video signal representing said captured optical image will constitute a sequence of video fields or frames comprising a series of first video fields or frames each representing a first exposure value of the captured image and a series of second video fields or frames each representing a second exposure value of the captured image, with said first video fields or frames being interspersed among said second video fields or frames;
    recording said resulting video signal in a recording medium;
    deriving from said resulting video signal a modified video signal comprising a continuous sequence of only said first video fields or frames or a continuous sequence of only said second video fields or frames; and
    applying said modified video signal to a display means whereby said captured optical image is displayed according to the video field or frame information contained in said modified video signal.

5. A method according to claim 4 wherein said modified video signal is derived from the video signal recorded in said recording medium.

6. A method according to claim 4 wherein said modified video signal is produced by processing said resulting video signal so as to blank out said second video fields or frames and replacing said blanked-out second video fields or frames with previously generated first video fields or frames.

7. A video camera system comprising:

a video camera for capturing an optical image and producing an output video signal that characterizes a continuous sequence of video fields or frames representing the captured optical image, said camera comprising a video detector means for generating said output video signal according to the light received from said optical image, and exposure control means for adjusting the amount of light received by said video detector from the optical image;

an exposure controller for said exposure control means so as to vary the amount of light on a video field or frame basis, whereby said output video signal characterizes an alternating sequence of at least first and second video fields or frames of with said first video fields or frames representing the optical image captured with a first exposure value and said second video fields or frames representing the optical image captured with a second substantially different exposure value; and means responsive to said output video signal for accomplishing one or more of the following actions: (a) producing a video display of the optical image according and in response to only said first video fields or frames; (b) producing a video display of the optical image according and in response to only said second video fields or frames; and (c) recording said output video signal for use subsequently to produce a video display of the optical image according and in response to said first video fields or frames or said second video fields or frames.

8. A video camera system according to claim 7 wherein said last-mentioned means comprises means for producing a first video display according and in response to said first video fields or frames and a second concurrent display according and in response to said second video fields or frames.

9. A video camera recording system comprising:

a video camera for capturing an optical image and producing an output video signal that characterizes a continuous sequence of video fields or frames representing the captured image, said camera comprising a video detector means for generating said output video signal according to the light received from said image, and exposure control means for adjusting the amount of light received by said video detector from the optical image;

an electronic exposure controller for said exposure controller means so as to vary the amount of light on a video field or frame basis, whereby said output video signal characterizes a continuous sequence of video fields or frames comprising at least first and second fields or frames of different exposures with said first fields or frames interspersed among said second fields or frames in a selected order;

recorder means for recording and playing back said output video signal;

signal processing means coupled to said recorder means for receiving said output video signal as it is read out of said recorder means and deriving therefrom a modified video signal comprising a sequence of only said first video fields or frames or only said second video fields or frames; and means responsive to said modified video signal for producing a video display in accordance with said sequence of first or second fields or frames.

10. A video camera system comprising:

means for producing a series of video signals representing a continuous sequence of video fields or frames of a selected optical image with at least certain of the video fields or frames comprising data representing a first exposure level and others of said fields or frames comprising data representing a second greater or lesser exposure level, said certain video fields or frames being interspersed in said sequence among said other video fields or frames; and circuit means for processing and utilizing said video signals to provide a flicker free video display of said selected optical image according to said first or second exposure levels only.

11. A video camera system according to claim 10 wherein said circuit means comprises (a) a multiplexer for blanking said certain fields or frames that comprise data representing said first exposure level and replacing said blanked fields or frames with fields or frames comprising data representing said second exposure level, whereby to produce a modified video signal and (b) means for applying said modified video signal to a video display means to provide a flicker free video display of said optical image according to the data representing said second exposure level.

12. A method for capturing and displaying video images comprising:

using a video camera to generate a video signal output that defines a continuous sequence of video fields or frames representing a captured optical image, with at least first and second fields or frames representing the image captured with first and second different exposure times respectively, and said first and second fields and frames being produced in a consistent repetitive sequence with said first video fields or frames being interspersed in said continuous sequence among said second video fields or frames;

processing said video signal output to provide (1) a first modified video signal that defines a continuous sequence of said first fields or frames, and (2) a second modified video signal that defines a continuous sequence of said second fields or frames; and utilizing said first and second modified video signals to produce separate displays of said captured optical image according to the exposures represented respectively by said by said first and second fields or frames.

13. A method of producing a video recording with improved dynamic range comprising:

providing a video sensor capable of converting an optical image into a video signal comprising a sequence of video fields or frames representing the optical image;

operating said video sensor to capture an optical image and simultaneously varying the amount of light received by said video sensor during the time frame of each video frame so that the resulting video signal representing said captured optical image will constitute a sequence of video or frames comprising at least a plurality of first frames representing a first exposure value of the captured image and a plurality of second frames representing a second exposure value of the captured image, with said first frames being interspersed among said second frames in said sequence;

deriving from said resulting video signal a modified video signal comprising a continuous sequence of said first frames or a continuous sequence of said second frames; and applying said modified video signal to a display means whereby said captured optical image is displayed according to the video information contained in said modified video signal.

14. A method of recording and displaying video images comprising;
   capturing a series of successive video images using different exposure times, with the exposure times varying according to a predetermined pattern so that first video images captured using a first exposure time are interspersed in said series with video images captured using a second and third exposure times that differ from each other and also from said first exposure time;
   producing a video signal representing said series of video images in the order that they are captured; and
   using said video signal to generate a first video display of the video images captured using only one of said first, second and third exposure times.

15. A method according to claim 14 further including the step of using said video signal to generate a second video display of the video images captured using another of said first second and third exposure times.

16. A method according to claim 15 wherein said first and second displays are presented simultaneously.

17. A video camera system comprising:
   a video camera for capturing optical images and producing an output video signal that characterizes a continuous sequence of video fields or frames representing the captured optical images, said camera comprising a video detector means for generating said output video signal according to the light received from said images, and exposure control means for adjusting the amount of light received by said video detector from the optical images;
   a controller for controlling said exposure control means so as to vary the amount of light on a video field or frame basis, whereby said output video signal characterizes a continuous sequence of video fields or frames comprising at least first, second and third video fields or frames of different exposures, with said third video fields or frames interspersed among said first and second fields or frames;
   signal processing means for deriving from said output video signal a modified video signal comprising a sequence of only said first, second or third video fields or frames; and
   means responsive to said modified video signal for producing a video display in accordance with said sequence of first, second or third video fields or frames.

18. A video system in accordance with claim 17 further including field code means for adding a first field code to each of said first video fields or frames, a second different field code to each of said second video fields or frames, and a third field code to each of said third video fields or frames, and further wherein said signal processing means utilizes said field codes to generate said modified video signal.

19. A video camera recording system according to claim 9 further including means for adding a first field code to each first video field or frame and a second field code to each second field or frame characterized by said output video signal, and further wherein said signal processing means includes detector means for detecting said field codes and means responsive to said detector means for deriving said modified video signal from said output video signal on the basis of field codes detected by said detector means.

20. A method for capturing and displaying video images comprising producing a continuous sequence of video signals representing a series of first and second video fields or frames representing images captured using relatively short and relatively long exposure times respectively, with said first video fields or frames being interspersed among said second video fields or frames, and using that sequence of video signals to generate a video display comprising (a) only the images captured using said relatively short exposure time or (b) only the images captured using said relatively long exposure time.

21. A method for capturing and displaying video images comprising:
   using a video sensor to generate a sequence of video signals comprising a series of first video fields or frames representing images captured by said video sensor during a first relatively short exposure time, a series of second video fields or frames representing images captured by said video sensor during a second relatively long exposure time, and a series of third video fields or frames representing images captured by said video sensor during a third exposure time shorter than said second exposure time but longer than said first exposure time, with said first, second and third video fields or frames being generated according to a predetermined pattern wherein said third video frames or fields are interspersed among said first and second video fields or frames; and
   using said sequence of video signals to generate a display of said images as represented by (a) only said first video fields or frames or (b) only said second video fields or frames or (c) only said third video fields or frames.

22. A method according to claim 21 wherein said sequence of video signals is used to generate two displays of said images, one display consisting of the images as represented by one of said series of said first, second and third video fields or frames and the other display consisting of the images as represented by another of said series of first, second, and third video fields or frames.

23. An image recording system comprising:
   a camera comprising an image sensing device for capturing optical images and producing an output video signal that characterizes a continuous sequence of fields or frames representing the captured images according to the light received from that image, and exposure control means for adjusting the amount of light received by said image sensing device from the optical image;
   an exposure controller for operating said exposure control means so as to vary the amount of light received by said image sensing device on a field or frame basis, whereby said output video signal characterizes a continuous sequence of first and second fields or frames with said first fields or frames having a first exposure value and said second fields or frames having a second exposure value and occurring alternately in time with said first fields or frames;
   recorder means for recording and playing back said output video signal;
   signal processing means for receiving said output video signal from said camera or from said recorder means and deriving from said output video signal a modified video signal comprising a sequence of only said first fields or frames or only said second fields or frames; and
   means responsive to said modified video signal for producing a video display of the captured images as represented by said sequence of first fields or frames or said sequence of second fields or frames.

* * * * *

UNITED STATES PATENT AND TRADEMARK OFFICE
CERTIFICATE OF CORRECTION

PATENT NO.    : 6,985,185 B1
DATED         : January 10, 2006
INVENTOR(S)   : John O. Crawford et al.

It is certified that error appears in the above-identified patent and that said Letters Patent is hereby corrected as shown below:

<u>Column 13,</u>
Lines 48 and 49, change "controller" to -- control --;

<u>Column 14,</u>
Line 46, delete "by said" (second occurrence);
Line 52, delete "fields or" before "frames";
Line 58, delete "or" before "frames";

<u>Column 15,</u>
Line 12, delete "a" before "second"; and
Line 21, insert a comma after "first".

Signed and Sealed this

Eighteenth Day of April, 2006

JON W. DUDAS
*Director of the United States Patent and Trademark Office*